United States Patent

[11] 3,581,075

[72] Inventors Orjan Mats Mattsson
Taby;
Walter Herbert Ewin Widl, Bandhagen,
both of, Sweden

[21] Appl. No. 810,321
[22] Filed Mar. 25, 1969
[45] Patented May 25, 1971
[73] Assignee Telefonaktiebolaget LM Ericsson
Stockholm, Sweden
[32] Priority Apr. 18, 1968
[33] Sweden
[31] 5174/1968

[54] ARRANGEMENT FOR DISCONNECTING A DEFECTIVE LOCAL CONCENTRATOR IN A DATA TRANSMISSION SYSTEM
1 Claim, 3 Drawing Figs.

[52] U.S. Cl. .......... 235/153, 340/146.1, 178/69, 340/163
[51] Int. Cl. .......... G08c 25/00, G06f 11/00
[50] Field of Search .......... 340/146.1, 163; 178/69, 70; 315/122; 317/29, 30; 235/153

[56] References Cited

UNITED STATES PATENTS

| | | | |
|---|---|---|---|
| 3,273,017 | 9/1966 | Mathews | 307/29 |
| 3,436,479 | 4/1969 | Houcke, et al. | 178/69 |
| 3,440,337 | 4/1969 | Creasy, et al. | 178/70 |
| 3,444,321 | 5/1969 | Pantos | 178/69 |

*Primary Examiner*—Malcolm A. Morrison
*Assistant Examiner*—Charles E. Atkinson
*Attorney*—Hane and Baxley

ABSTRACT: In a data transmission system comprising a number of remote terminals connected in series to a main terminal via a data transferring line inquiries are cyclically sent out from the main terminal to the respective remote terminals. If a fault occurs in a terminal this will affect the whole system. Accordingly each terminal is provided with a shunting arrangement which disconnects a faulty terminal without affecting the rest of the system.

PATENTED MAY 25 1971 3,581,075

INVENTORS
ÖRJAN MATS MATTSSON
WALTER HERBERT ERWIN WIDL

BY Hane and Baxley
ATTORNEYS

ARRANGEMENT FOR DISCONNECTING A DEFECTIVE LOCAL CONCENTRATOR IN A DATA TRANSMISSION SYSTEM

The present invention refers to an arrangement for disconnecting a defective remote terminal in a data transmission system, comprising a number of remote terminals connected in series to a main terminal via a data transferring line.

An object of the invention is to provide faultless data transmission between the main terminal and the remote terminals even if one of the remote terminals is defective.

Figures 1, 2:
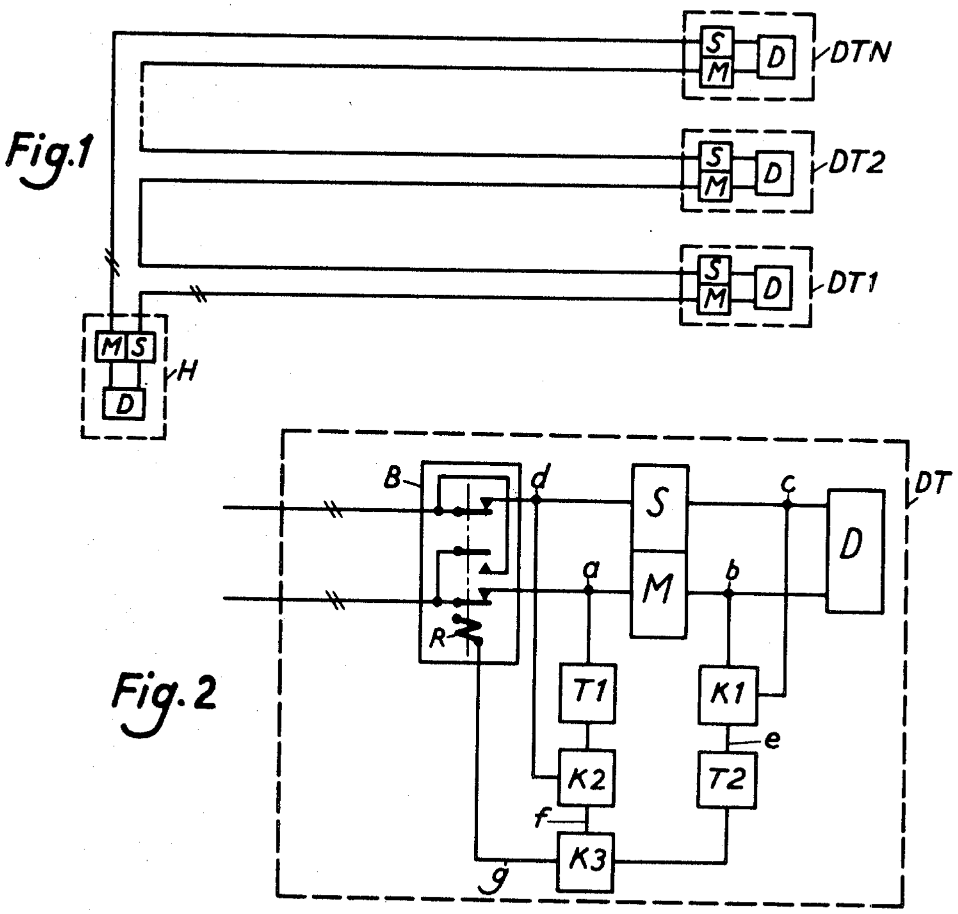
Figure 3:
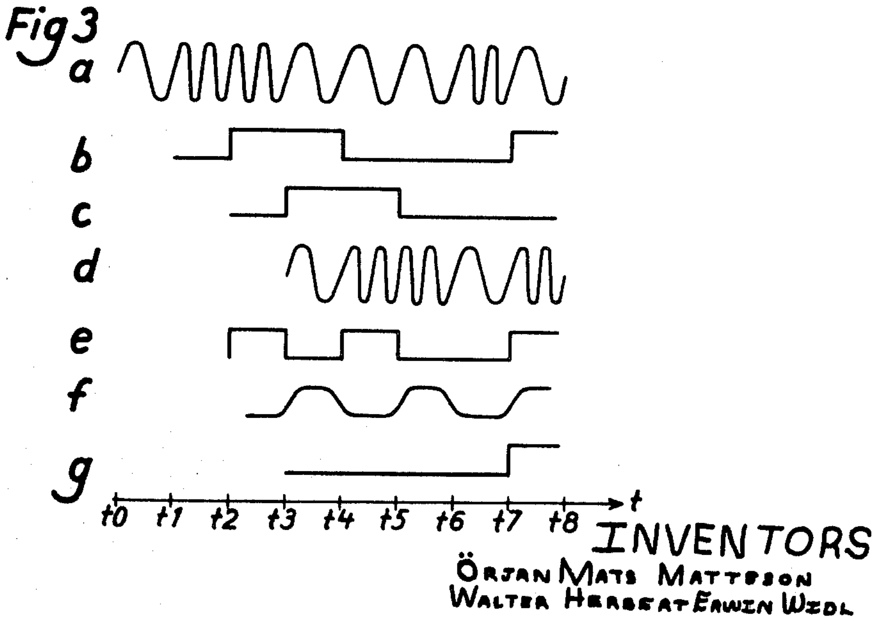

The invention will be described in detail with reference to the accompanying drawing, where FIG. 1 shows a block diagram of a data transmission system, FIG. 2 shows a block diagram of a remote terminal and FIG. 3 shows a timing diagram of signals at various points in a terminal.

In FIG. 1 the reference H denotes a main terminal, comprising a computer D and a modulator-demodulator unit with a transmitter part S and a receiver part M for transmitting inquiries to a number of remote terminals DT1, DT2.....DTN connected in series to the main terminal. Each remote terminal also comprises a computer D and a modulator-demodulator unit S–M. From the computer D of the main terminal H, data information is supplied to the transmitter part S of the modulator-demodulator unit. The data information may consist of, e.g., an address to one of the terminals DT1, DT2.....DTN and an inquiry or an order to the addressed terminal. In the transmitter S of the main terminal H the data information obtained from the computer D is converted into an audio signal by e.g. frequency—or phase shift modulation. The audio signal obtained in this way is then supplied to the line connecting the main remote terminal with the terminals.

As an example, the transmitted data information can consist of the address of the remote terminal DT2 accompanied by an order. The transmitted audio signal is first received by the receiver M of the remote terminal DT1. It is then demodulated and supplied to the computer D. In the computer, the address part of the demodulated signal is sensed. Since the address in this assumed case was intended for the terminal DT2, the terminal DT1 will not process the received order part, but will supply the address as well as the order to the transmitter S. The transmitter S of the terminal DT1 converts the data information again into an audio signal identical with that obtained from the main terminal H, and the audio signal is supplied to the receiver M in the terminal DT2.

The signal is demodulated in the same way as in the terminal DT1, and then the computer D of the terminal DT2 controls the address part. As assumed above the address was intended for the terminal DT2, and as a result, the order part of the information will be processed by said terminal. The data processing may consist of exchanging the address information in the received data information by e.g. the address to the main terminal H and replacing the order information by a reply information to the main terminal.

After this the new data information is supplied to the transmitter S of the terminal DT2 and after conversion to an audio signal the data information is transmitted to the succeeding terminal, i.e. terminal DT3. Demodulation and control of the address part of the information is carried out in the same way as in the terminals DT1 and DT2 and since the address information now consists of the address to the main terminal the data information is after modulation supplied to the next terminal, and so on. Finally the data information reaches the main terminal H, where the reply information is processed by the computer D.

This interchange of information between the main terminal and the terminals may be going on continuously and it is therefore very important that the equipment within the system works perfectly. If for example a binary "1" obtained from a computer becomes a binary "0" upon modulation, e.g. due to a fault in the modulators, the continued function of the system will be faulty. In order to prevent a fault in a demodulator or a modulator from paralyzing the whole data transmission system, an arrangement according to the invention is suggested as will be described more in detail in connection with FIG. 2.

As mentioned above, a terminal of the type shown in FIG. 2 comprises a modulator-demodulator unit S–M and a computer D. According to the invention a circuit is arranged in each terminal to disconnect a defective terminal when a fault occurs in the modulator-demodulator unit so that the data information arriving at a defective terminal is shunted past the defective terminal. The incoming data information will thus be supplied to the succeeding terminal without being influenced by the defective modulator-demodulator unit. In order to detect a fault in the modulator-demodulator unit in the terminal the binary information of the signal coming in to the receiver M will continuously be compared with the signal transmitted from the transmitted S, and the binary information of the signal from the receiver M to the computer D will be compared with the signal from the computer to the transmitter S. In both cases two alternative signals are obtained as a result of the comparisons, an equality signal or an inequality signal. When the transmitter as well as the receiver are working faultlessly, an equality signal must be obtained from both comparisons at the same time or an inequality signal from both comparisons at the same time. If, on the other hand, a fault occurs the transmitter or in the receiver, an equality signal and an inequality signal will be obtained which makes it possible to control a shunting arrangement B. In order to be able to compare the same two signals on both the line and the computer side of the modulator-demodulator unit, two delay arrangements T1 and T2 are necessary. The function of the arrangement will appear in connection with the waveforms in FIG. 3.

Assume that a frequency modulated signal enters the terminal DT1 in FIG. 1. The signal is assumed to be intended for the terminal DT2. In point a in FIG. 2 said signal has a waveform according to FIG. 3*a*. Low frequency is supposed to correspond to a binary "1" and high frequency to a binary "0." Within each time interval $t0$—$t1$, $t1$—$t2$, .....$t7$—$t8$ there is a bit. From the receiver M (point *b*) b) a signal according to FIG. 3*b* is obtained as a result of a faultless demodulation. If the delay in the demodulator corresponds to e.g. one time interval, the demodulated signal will appear in point *b* at the time $t1$. The address part of the received signal is then controlled in the computer D. Since the signal is addressed to the terminal DT2, the address and the order parts of the received signal will be supplied unchanged to the output of the computer D with a time delay. In point *c* in FIG. 2 the signal appears at the time $t2$ as shown in FIG. 3*c*. The delay in the computer D is assumed to be equal to one time interval. The transmitter S also delays the signal one interval and so the signal appears in point *d* at the time $t3$ according to FIG. 3*d* after it has been frequency modulated once more. After that it is supplied to the succeeding terminal DT2.

The signals appearing in points *b* and *c* are continuously compared in a comparator K1 with respect to equality and inequality. The comparator K1 may e.g. consist of an AND-circuit having two inputs, one being inverting. In the assumed example a signal according to FIG. 3*e* is obtained on the output of the comparator K1. In a corresponding way the signal in point *d* and the signal in point *a*, delayed two intervals in a delay arrangement T1, are continuously compared in a comparator K2. By the delay arrangement T1 the same delay is obtained between the signals in points *a* and *d*, and between the signals in points *b* and *c*. The comparator K2 may for example consist of a modulator, from which a signal according to FIG. 3*f* is obtained. When the receiver as well as the transmitter are working faultlessly, as described above, the binary information of the signals in points *e* and *f* are the same. The signal in point *f* is however delayed one interval compared with the signal in point *e*. In order to detect an inequality between the signals in points *e* and *f* a comparator K3 is arranged. The comparator K3 has two inputs, the signal from the comparator K2 being supplied to one of the inputs and to the other input the signal from the comparator K1 being supplied after it has been delayed one interval in the delay arrangement T2 in order to make the signals obtained from the comparator K1 appear simultaneously with the signal obtained from the comparator K2.

It is assumed that between the times $t6$ and $t7$ a fault occurs in the modulator part of the transmitter of the terminal DT1. Therefore a binary "0" appears as a binary "1" after modulation. This faulty "1" appears in point *d* between the times $t7$ and $t8$. The comparator K3, comparing the two signals, activates a shunting arrangement B when the signals are unequal, so that the receiver M and the transmitter S are disconnected and the incoming data information is shunted past the defective terminal. In the interval $t7$—$t8$ the signals are thus unequal in points *e* and *f*. This unequality results in a pulse on the output of the comparator K3, as shown in FIG. 3*g*. The pulse can activate a relay R to disconnect the receiver M and the transmitter S from the line and short circuit the incoming and the outgoing line, whereafter the continued function of the system will be independent of the defective terminal.

In data transmission systems according to FIG. 1 the data information is cyclically sent out from the main terminal H to the terminals DT1.....DTN, a cycle constituting the time during which an address information and an order information are supplied in series to each terminal from the main terminal. If a fault occurs during a cycle the cycle is repeated. In the assumed example the data information will be repeated in the succeeding cycle, during which the terminal DT1 is not connected and the information will thus be supplied directly to the terminal DT2.

I claim:

1. In a data transmission system comprising a plurality of remote terminals connected in series to a main terminal via a data transferring line, wherein each of said remote terminals comprises a modulator and a demodulator connected to said data transferring line, a computer connected to said modulator and said demodulator, a circuit arrangement included in each of said remote terminals for disconnecting a defective remote terminal without disturbing the function of the other remote terminals comprising a first comparator for comparing data information being received by said demodulator from said data transferring line with data information being transferred from said modulator to said data transferring line for generating equality and inequality signals, a second comparator for comparing data information being transferred from said demodulator to said computer with data information being received by said modulator from said computer for generating equality and inequality signals, a third comparator for comparing the signals generated by said first and second comparators and generating a control signal when the signals being compared are unequal, a control signal activatable shunting means interposed between said modulator and demodulator and said data transferring line for disconnecting said modulator and demodulator from said data transferring line and introducing a shunt path for said data transferring line across the terminal, and means for connecting the output of said third comparator to said control signal activatable shunt means.